United States Patent [19]

Ross

[11] 3,956,626
[45] May 11, 1976

[54] PULSE QUATERNARY COMMUNICATION MEANS

[75] Inventor: Monte Ross, Ladue, Mo.

[73] Assignee: McDonnell Douglas Corporation, Long Beach, Calif.

[22] Filed: June 14, 1973

[21] Appl. No.: 369,819

[52] U.S. Cl. ............................. 250/199; 350/159
[51] Int. Cl. .......................................... H04b 9/00
[58] Field of Search ............ 250/199; 350/147, 150, 350/151, 157, 159; 340/167 R, 167 B; 325/321, 60; 332/7.51; 179/15 BC

[56] References Cited
UNITED STATES PATENTS

| | | | |
|---|---|---|---|
| 3,430,048 | 2/1969 | Rubinstein | 250/199 |
| 3,440,424 | 4/1969 | Buhrer | 250/199 |
| 3,532,890 | 10/1970 | Denton | 250/199 |
| 3,705,986 | 12/1972 | Sanders et al. | 250/199 |

Primary Examiner—Benedict V. Safourek
Attorney, Agent, or Firm—Charles B. Haverstock

[57] ABSTRACT

A pulse quaternary modulator especially to enable laser communication systems when working at high data rates to be able to operate on less laser power and on a modulation format that improves modulation efficiency. The subject modulation means can be used in transmitters and receivers and include means that make use of polarization changes in the modulator to create selective high speed electronically controlled optical time delays, and it also includes means for using a combination of polarization state and pulse position information to represent information choices. The subject means are also able to achieve M-ARY modulation when using as a source a mode-lock laser which produces output laser pulses.

33 Claims, 12 Drawing Figures

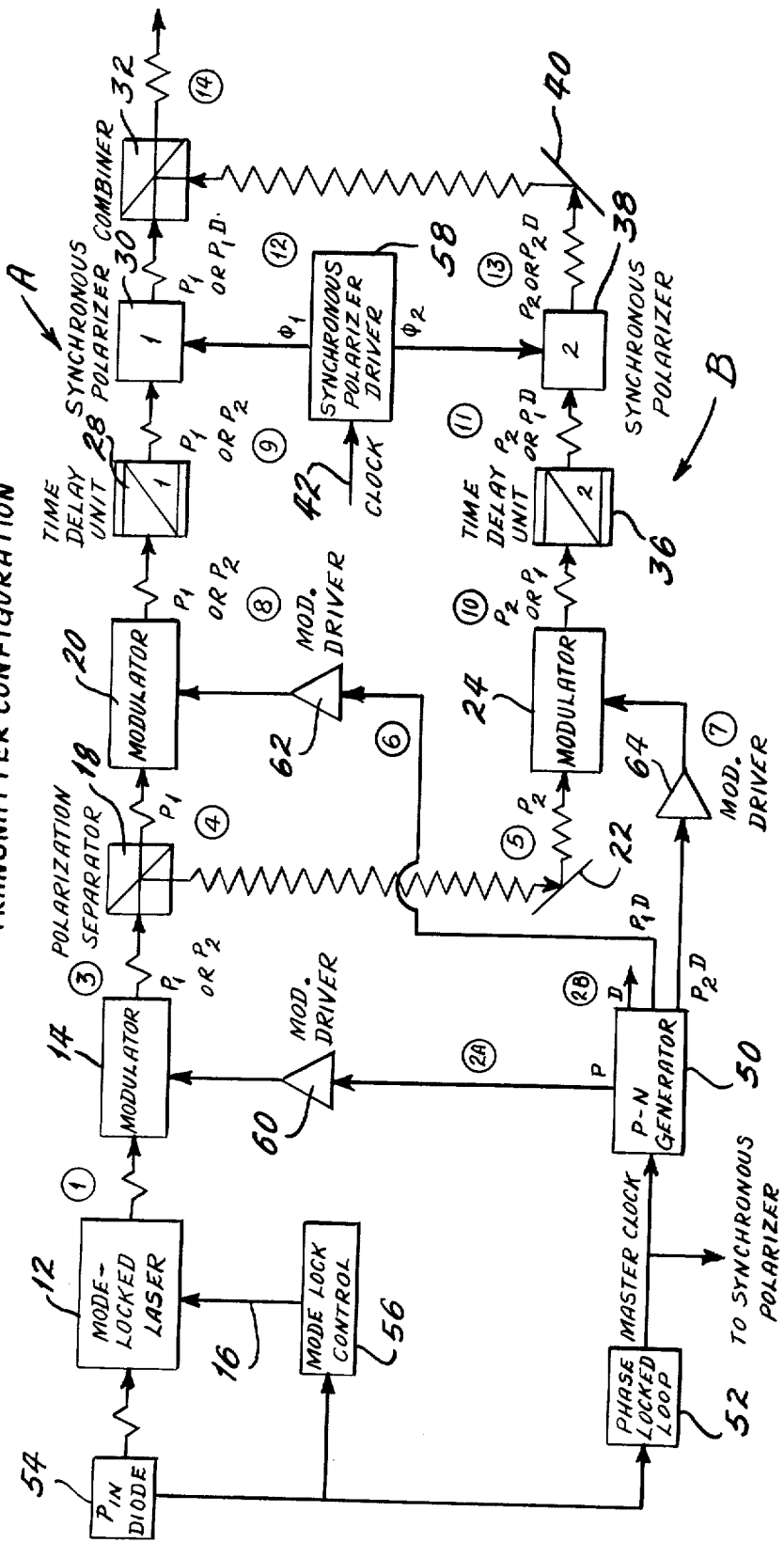

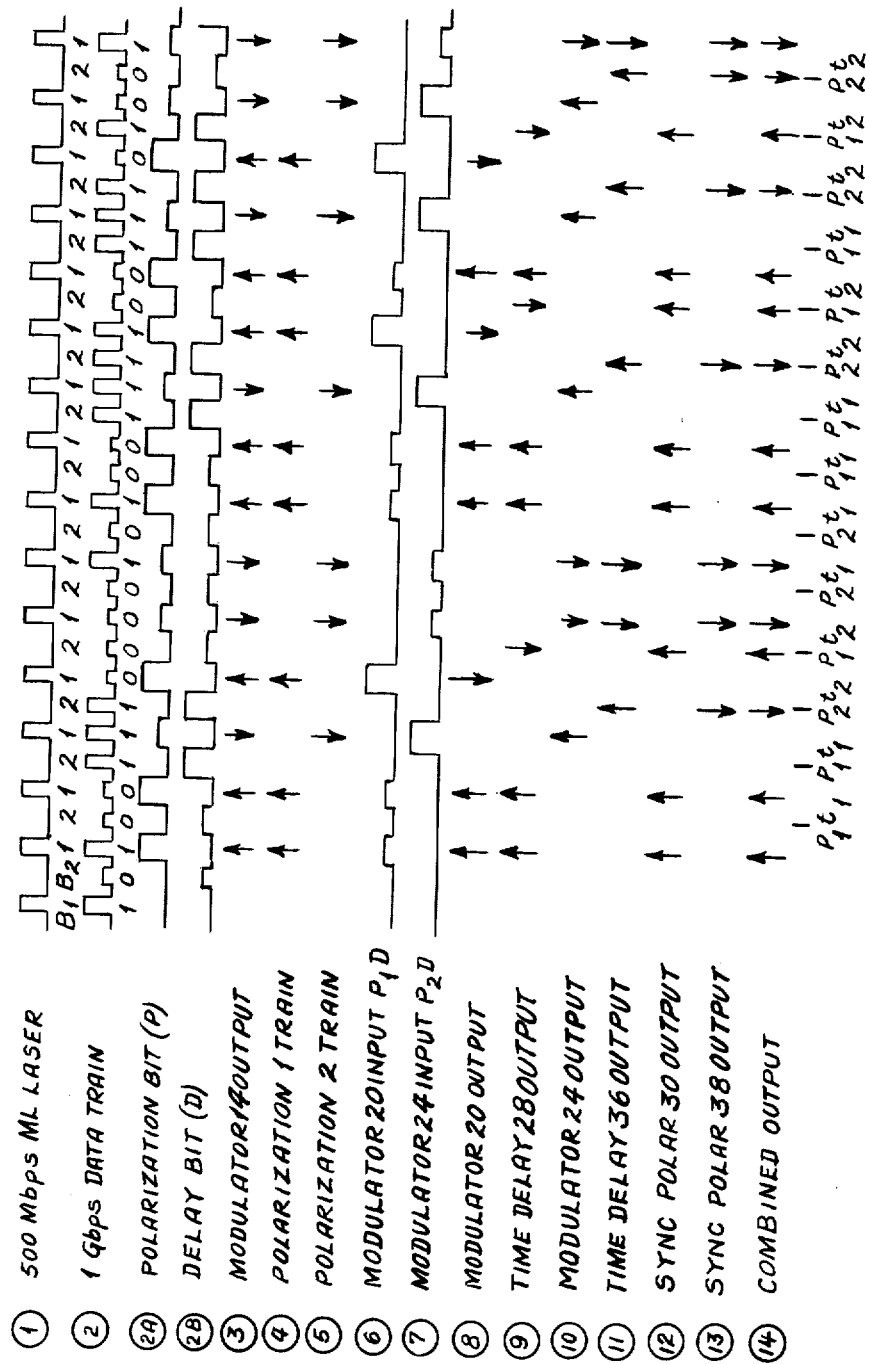

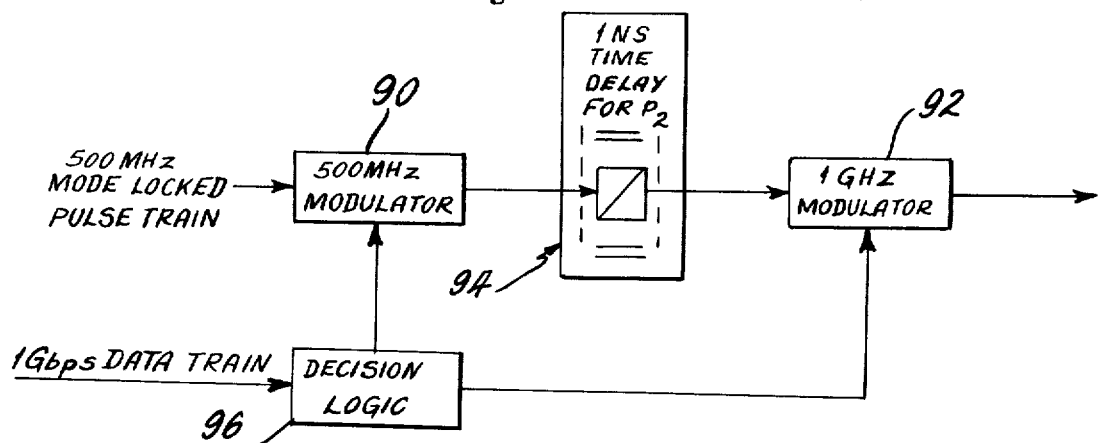
FIG.4 PQM TRANSMITTER
Single Channel Implementation
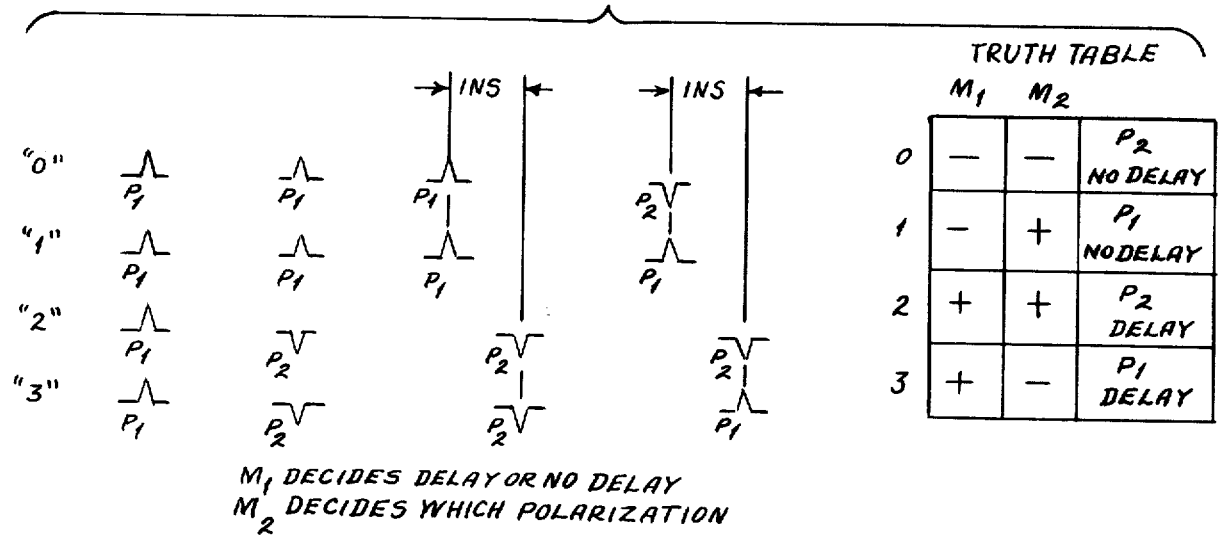
FIG.4A
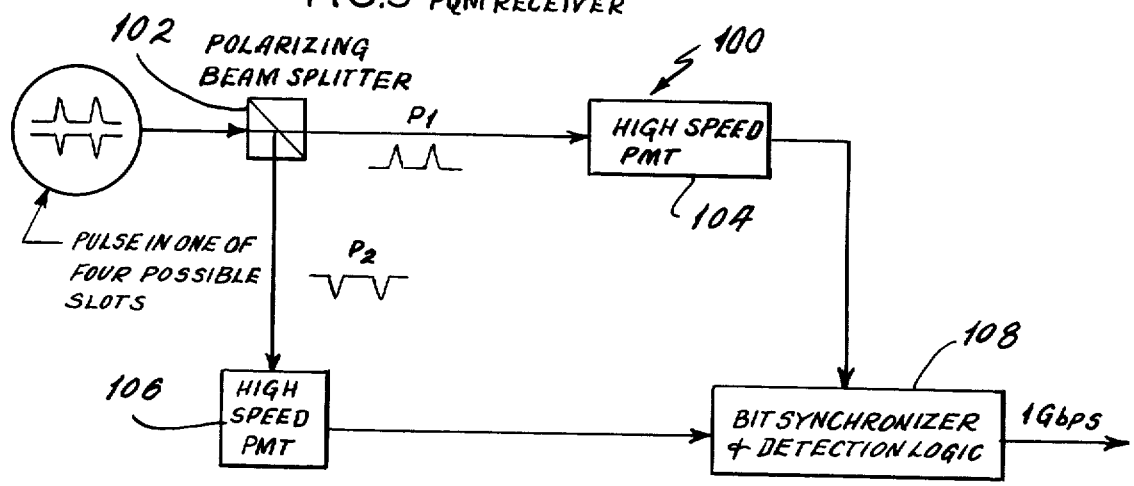
FIG.5 PQM RECEIVER

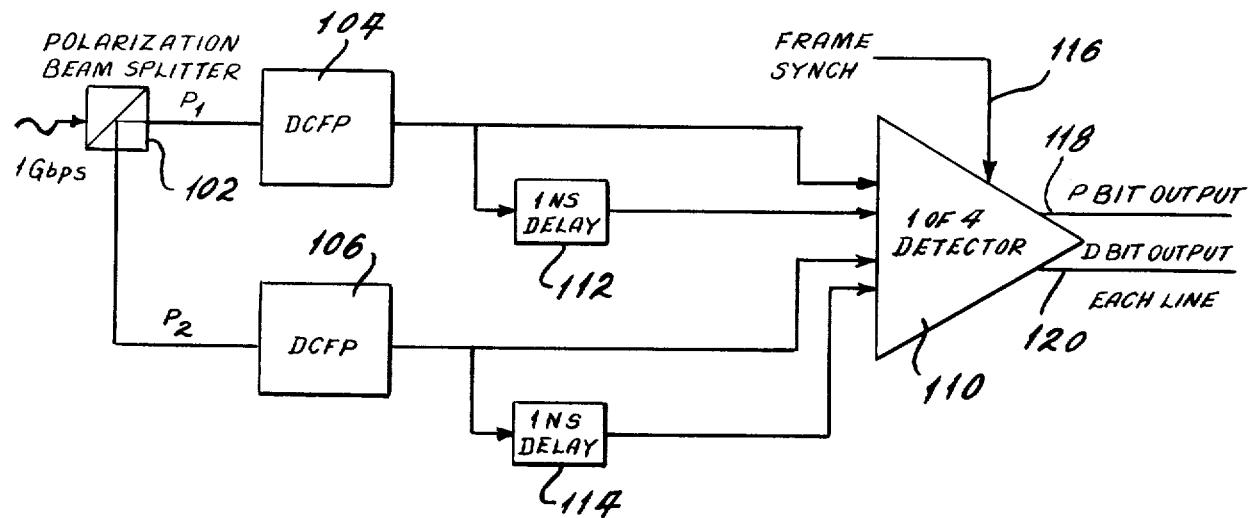
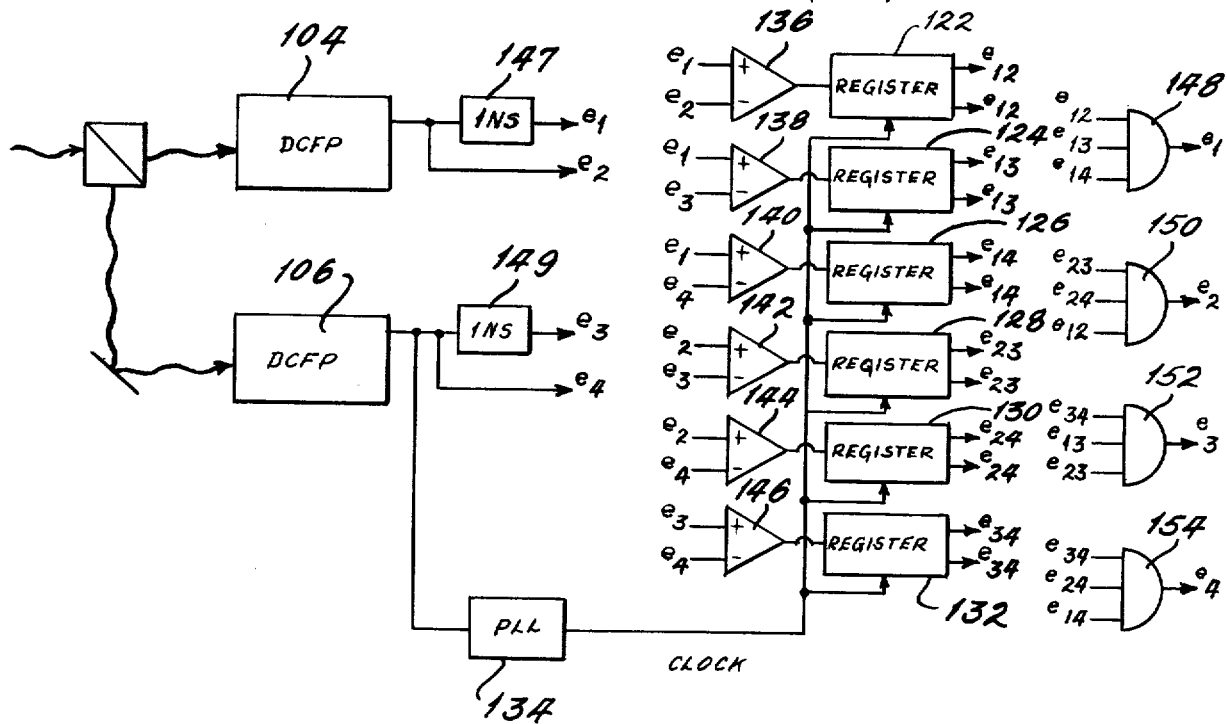

FIG. 8 PQM TRANSMITTER (4 DISCRETE TIME POSITIONS)
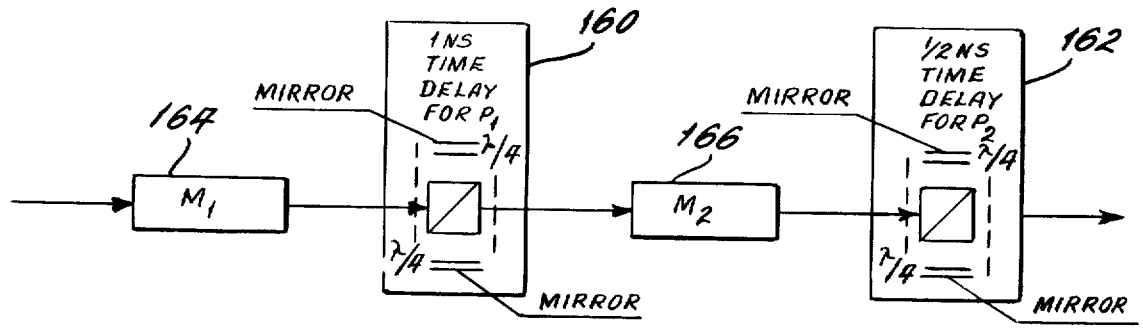
FIG. 8A
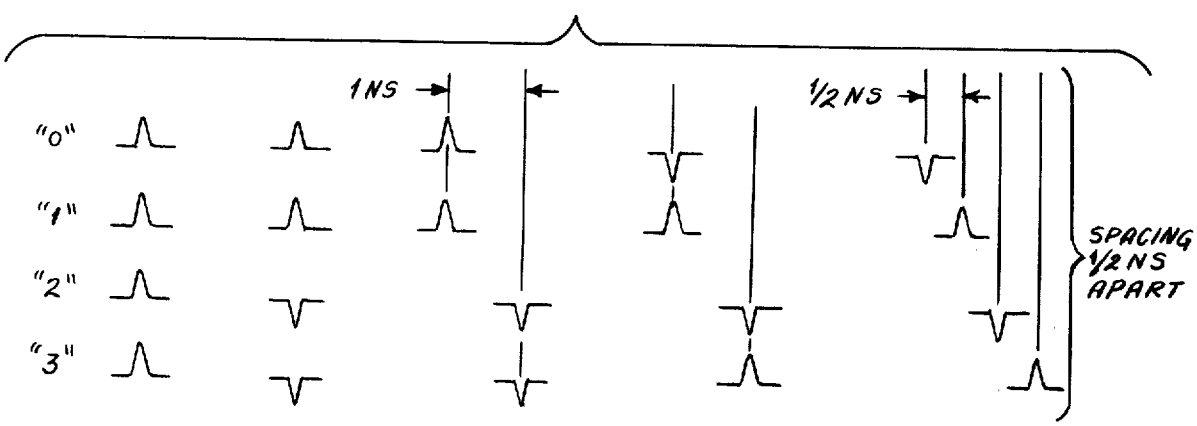
FIG. 9 PQM SINGLE DETECTOR RECEIVER
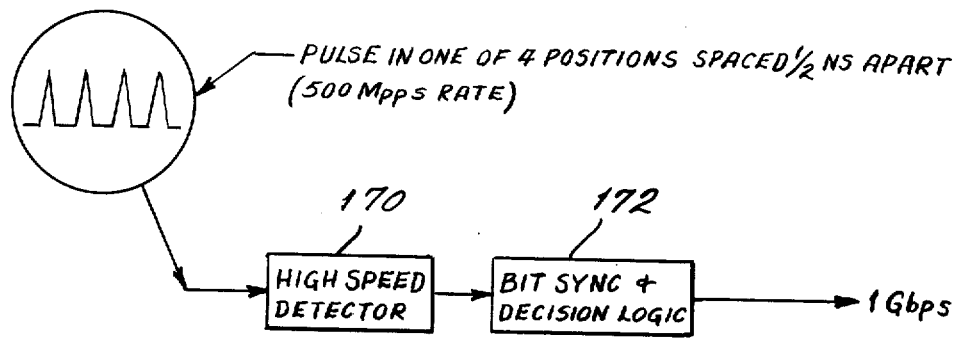

PULSE QUATERNARY COMMUNICATION MEANS

A pulse quadrature modulation technique is a technique which operates upon laser input pulses that are received from a laser source, such as from a mode-locked laser, and performs one of four possible operations on each of the laser pulses which can then be transmitted, received, and detected. All of these operations are accomplished on the signal at optical frequencies which range from about $10^{13}$ Hz to $10^{15}$ Hz. Each laser input pulse which enters the subject modulator or demodulator with some form of polarization such as polarization $P_1$ may have any one, but only one, of the following four operations performed on it:

1. Each input pulse can have its polarization changed to a different polarization $P_2$ without any associated time delay;
2. Each pulse can have its input polarization $P_1$ remain the same without any time delay in which case nothing is done to the laser input pulse;
3. Each pulse can have its input polarization $P_1$ changed to a different polarization $P_2$ and it can also be delayed by some predetermined time delay T; or,
4. Each input pulse can have its input polarization $P_1$ remain the same and it can be delayed by the same predetermined time delay T.

In laser communication links and especially links that operate in the gigabit per second range, probably the most significant parameter is the communication efficiency. Communication efficiency is a parameter that is measured in terms of the required photoelectrons per bit at the high speed detector. The photoelectrons per bit translates in a given system, and for other fixed system parameters, into the required laser transmitter power. The required laser power is an important parameter in sub-system design since most of the power required to operate any given system is used in the operation of the laser source itself and relatively little power is required for the rest of the system. The power requirement is also an important factor because it induces a heavy weight penalty on systems operating on self-contained power systems especially in terms of solar cell battery weight and thermal control needs when operating in space. This in turn requires more structural weight and thus a larger payload if the subject means are to be used on a system such as a communication system satellite. There is also the problem that as the power requirement increases other technical problems arise in maintaining the laser in a stable operating condition. Therefore, anything that will improve the system efficiency and reduce the power requirements is to be highly desired. One possibility for accomplishing this is in the choice of the modulation format and this is where the present invention becomes important. For example, the present system involves a modulation format using a mode-locked laser which is a laser source wherein the laser output has a pulse quaternary modulation (PQM) imposed on it. The advantage of this type of operating format is that it has a theoretical improvement of about 5 or 6 decibels (dB) over other known forms of modulation including those such as pulse gated binary modulation (PGBM) and so forth. This means that by using quaternary modulation means a bit error of $10^{-6}$ can be achieved in an optical communication link with only 5 photoelectrons/bit detected in the receiver. For more conventional modulation formats such as pulse code modulation (PCM), it would take 20 photoelectrons/bit under the same conditions for a bit error rate of $10^{-6}$. The requirement of one-fourth the detected energy also means that only one-fourth of the laser power is required, such that, for example, as little as 10 milliwatts of energy laser power can be used to transmit 1 Gbps at 0.53 ($\mu$m) in a synchronous satellite to ground link. These examples of frequencies, pulse rates and other parameters as mentioned are given for illustrative purposes only and to indicate the considerable simplification in the laser requirements employed in the subject means as compared to other forms of modulation techniques including the PCM, the PGBM and others.

It is therefore a principal object of the present invention to provide a relatively simple pulse quaternary modulator.

Another and important object of the invention is to provide means to substantially increase the amount of information that can be imposed on the output of a mode-locked laser.

Another object is to substantially double the data rate that can be transmitted and received using pulsed optical energy.

Another object is to provide modulation means for use in laser communication links and like systems which systems are more efficient than any known system employing modulating means for the same or similar purpose of high data rate communications in excess of 100 Mbps.

Another object is to develop a modulation format using mode-locked lasers and which has a substantially improved communication efficiency as compared to other known laser communication systems of high data rate.

Another object is to reduce the size and weight of communication devices and systems in which a laser is used as an energy source.

Another object is to provide a pulse quaternary modulator designed to enable laser communication systems operating at relatively high data rates to operate with substantially less laser power requirements.

Another object is to make use of polarization changes in a modulator to create a high speed electronically controlled optical time delay.

Another object is to provide modulation means which make use of a combination of polarization states and pulse positions to establish a modulation format.

Another object is to provide means for achieving M-ARY modulation using mode-locked laser pulses.

Another object is to substantially reduce the power requirement of laser communication systems and the like by using pulse quaternary modulation instead of other forms of modulation such as pulse code modulation, pulse gated binary modulation, pulse delay binary modulation and so forth.

Another object is to provide a high data rate broadband modulator means.

These and other objects and advantages of the present modulation means will become apparent after considering the following detailed specification which discloses preferred embodiments of the subject modulation means in conjunction with the accompanying drawings, wherein:

FIG. 2 is a somewhat more detailed block diagram of a transmitter employing pulse quaternary modulation;

FIG. 2A is an enlarged view showing more of the details of the time delay units employed in the configuration of FIG. 2;

FIG. 3 is a timing diagram showing the timing and timing relationships of the various signals and responses that occur in the transmitters shown in FIGS. 1 and 2;

FIG. 4 is a simplified block diagram of a single channel transmitter implementation employing pulse quaternary modulation;

FIG. 4A is a diagram showing the pulse responses produced in the single channel transmitter configuration of FIG. 4 and including a truth table for use therewith;

FIG. 5 is a simplified block diagram of a receiver device employing pulse quaternary modulation means constructed according to the present invention;

FIG. 6 is another block diagram of the receiver of FIG. 5 but shown in somewhat more detail;

FIG. 7 is a block diagram showing another embodiment of a pulse quaternary modulation receiver;

FIG. 8 is a block diagram of a pulse quaternary modulation transmitter having four possible discrete time positions;

FIG. 8A is a diagram showing the pulse responses produced at the various circuit locations by the transmitter of FIG. 8; and, FIG. 9 is a simplified block diagram showing a single detector receiver employing pulse quaternary modulation.

Figure 1:
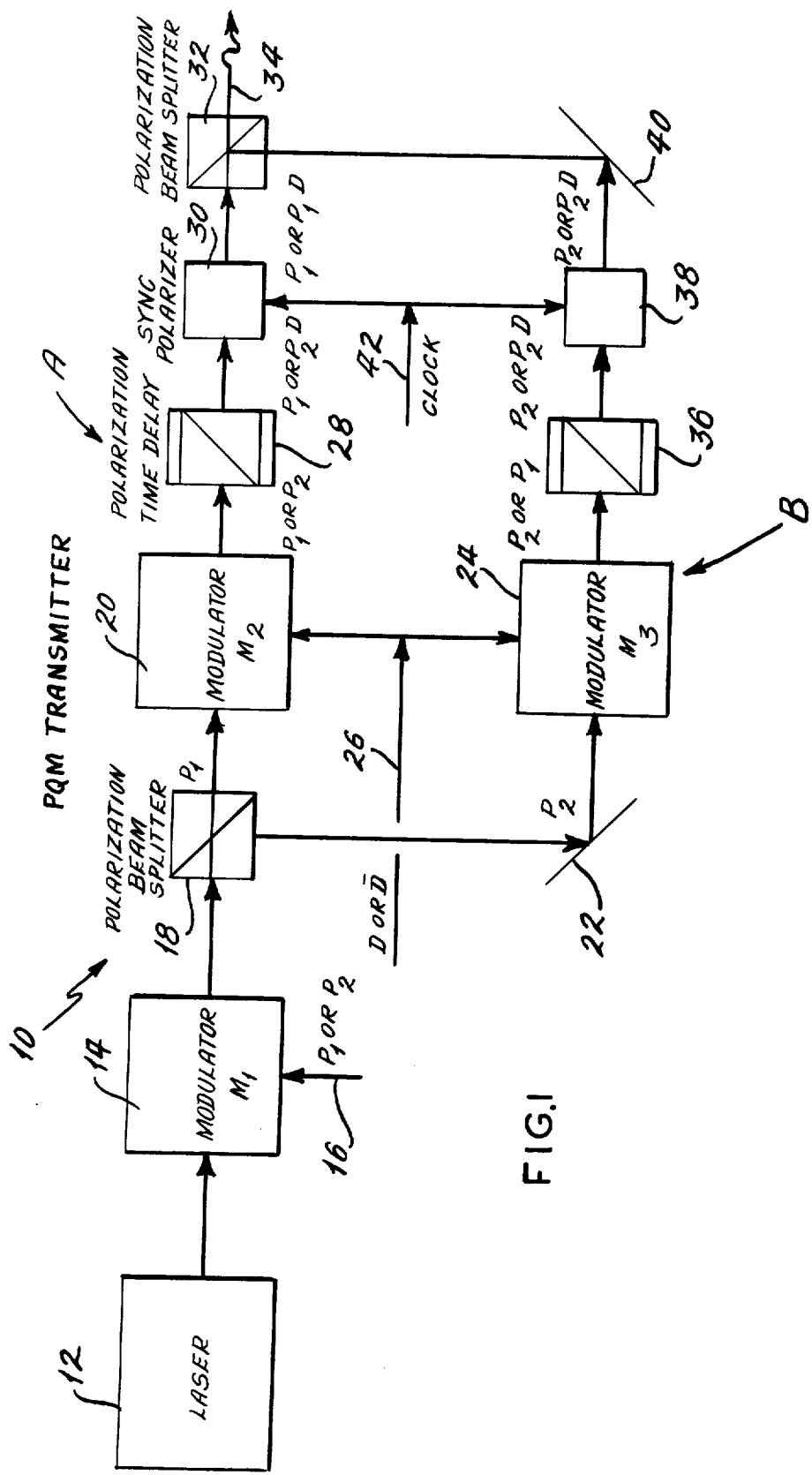
FIG. 1 is a block diagram of a laser transmitter employing pulse quaternary modulation means constructed according to the present invention.

Before proceeding to describe the structural and operational details of the subject laser communication links and of the modulation means employed in them, it will be well to set down certain nomenclature and abbreviations which will help in the understanding of the disclosure. The following terms and abbreviations will be used throughout the specification:

Pulse Quaternary Modulation (PQM) — this is a modulation technique or format which is applied to pulsed laser energy such as the energy output of a mode-locked laser, and which does one of four operations to the laser energy it receives.

M-ARY — refers to a modulation format in which the modulation system has M different choices of possibilities that it can impose on each pulse of laser energy. For example, a quaternary format where M = 4 refers to a modulator that can impose four different possible forms of modulation on each laser pulse.

Pulse Coded Modulation (PCM) — is a form of modulation technique in which the laser energy is modulated by changing the polarization thereof to cause laser pulses of one polarization but not of another polarization to occur.

A 1 GBPS laser communication link — is a link that is characterized by sending $10^9$ bits of information per second or an average of one bit per nanosecond.

Pulse Gated Binary Modulation (PGBM) — is a form of modulation used with mode-locked lasers and achieved by gating means such as by the use of solid state gating devices which are modulated to pass or not to pass the laser pulses by changing the polarization as in pulse code modulation.

T : term "polarization" as referred to in this specification refers to light or optical polarization and not to voltage polarization.

Extinction Ratio — refers to the quality of a crystal or other device in going from a turned on or pulse passing to a turned-off or no pulse passing condition. This ratio is a measure of modulator quality and it is usually desirable to have an extinction ratio as high as possible for better system operation. Most crystals have some built in light leakage which affects their extinction ratios.

Pulse Delay Binary Modulation (PDBM) — is a form of modulation which is used with mode-locked lasers in which pulses are delayed or not delayed and these are the only choices.

Photomultipliers (PMT) — are well known devices that may be associated with an optical receiver and many different kinds are known.

Dynamic Crossed Field Photomultipliers (DCFP) — are well known devices for converting optical energy to electric energy and include means for multiplying the magnitude or number of electrons produced in response to the received optical energy.

Phase-Lock Loop (PLL) — is a well known means used for clock recovery in digital communication systems by providing a narrow band filtering action by use of active electronic elements.

In recent years the desirability of establishing laser communication systems for some applications has been widely recognized, and considerable effort and research has been undertaken to develop such systems. One of the major problems in development of such systems is in the development of such a system that can be made to operate efficiently and accurately with relatively little power. One reason for this is that many of these systems are designed to be used on space vehicles such as on low altitude satellites as well as interplanetary and other such vehicles. A major obstacle in developing such a system has been to make the system as relatively small and compact as possible and also to design it to operate on as little power as possible. In respect to the power requirements, the main obstacle has been to develop a system which can use a lower power laser source since the laser source is the principal element of power consumption in most such systems. The present invention is the first that teaches means which enable the use of relatively low power lasers over long space distances and particularly low power mode-locked lasers, and this is made possible by the use of a pulse quaternary modulation technique which is applicable both to the transmitter and to the receiver portions of a communication system as well as to other devices and systems that use lasers. Several embodiments of the subject pulse quaternary modulation means are shown and described herein.

Referring more particularly to the drawing by reference numbers, the number 10 in FIG. 1 refers to a pulse quaternary modulation transmitter constructed according to one embodiment of the invention. In the embodiment of FIG. 1 pulse quaternary modulation is achieved by first modulating the polarization of the input laser pulses that come from the pulse source 12 to make them correspond to the first binary bit. The position in time of these pulses is then determined by associated secondary binary bits which will be described later. In order to accomplish this, the means of FIG. 1 are shown as being a two channel modulation system which are required because of the need to produce time delay modulation of selected polarizations. This is because the polarization is the parameter of the input pulses that varies according to the information sequence. The two channels, namely, channels A and B, shown in FIG. 1 are identical channels except for the fact that they respond to different input polarizations.

For example, all of the polarization for Channel A is of one type, namely, $P_1$, and all of the polarization for Channel B is of another type, namely, polarization type $P_2$. The output of the laser source 12 is a beam of coherent light pulses of some particular frequency such as 500 Mbps. The laser output is applied to a first modulator means 14, which modulator is controlled by electric input pulses it receives on lead 16 that determine one or the other form of polarizations $P_1$ or $P_2$ that is to be in the output. The use of two channel modulation is desired to avoid the need for higher speed modulator means which may not be available. This therefore is an important advantage of two channel operation.

The output of the modulator 14 is directed at and impinges on a polarization beam splitter element 18. This type of beam splitter has the characteristics of permitting the passage directly therethrough of components of the signal it receives of the first type of polarization $P_1$. These components pass directly to a second modulator 20. At the same time the beam splitter polarizer 18 bends or redirects those components it receives of the second type of polarization $P_2$ and these are directed toward a reflector member 22 which relfects them to another modulator 24. In other words, all of the $P_1$ type polarization energy is directed to the modulator 20 in the A Channel and all of the $P_2$ type polarization is directed to the modulator 24 in the B Channel. These modulators as used in the present construction are crystals mounted having their Z-axes oriented to be at right angles to each other and to the incoming signals they receive. The crystal members in the modulators 20 and 24 are also coupled to an input modulation source 26 which determines which of the modulators 24 or 20 is switched according to the predetermined logic of the PQM code or truth table.

The output of the modulator 20 is directed to a polarization time delay element 28, then to a synchronous polarizer element 30, and finally to another polarization beam combiner element 32 from which the modulated output signal 34 is taken. This output is a pulse position modulated light beam which is directed to means by which it can be optically rather than electronically detected.

The B Channel has a polarization time delay element 36 similar to the element 28 in the A channel, and it also has a synchronous polarizer 38 similar to the polarizer 30. The output of the polarizer 38 in the B Channel is an optically modulated signal which is reflected by another reflector 40 so that it is redirected back to the output polarization beam combiner element 32 where it is recombined with the output of the A Channel. The two synchronous polarizers 30 and 38 are controlled by clock pulses which are fed to them on lead 42. The purpose of the synchronous polarizers 30 and 38 is to place all pulses from a given channel into the same polarization before combining the outputs of the separate channels. This is to enable combining the outputs without serious loss of laser power. Thus it can be seen that the two channels are synchronized while at the same time Channel A is producing output pulses of one polarization $P_1$ (or $P_2$) while Channel B is producing output pulses at the other polarization $P_2$ (or $P_1$). The synchronous polarizers 30 and 38 are RF resonant electrooptic crystals which are driven by the clock source 42 at some predetermined clock frequency such as at 500 megahertz in the embodiment as disclosed. The selection of 500 Mbps and 500 megahertz in FIG. 1 is for illustrative purposes only since it is anticipated that the present construction can be made to operate at any desired frequency over a relatively broadband extending from approximately 100 MHZ to 10 GHZ. A particular operating frequency will also determine the selection of the desired optical components including the crystal components that are to be used.

The synchronous polarizer can be expected to operate at higher pulse rates and with higher extinction ratios than other known modulators since it operates with a constant signal frequency drive and thus can be carefully optimized for any particular frequency. The transmitter implementation of the invention has several features which are particularly desirable for this application including the fact that all but the first modulator 14 need operate only on an average on one-half of the total time. The individual components including the modulators, the beam splitters, the polarizers and the time delay means employed in the present modulator as well as the laser source selected can all be components selected from off the shelf and are therefore state-of-the-art items, another important advantage.

A more detailed block diagram of the transmitter shown in FIG. 1 is included in FIG. 2. The diagram of FIG. 2 should also be considered in conjunction with the timing diagram of FIG. 3 for a better understanding of the transmitter operation. The elements in FIG. 2 which have correspondence with elements of FIG. 1 are similarly numbered.

The pulse quaternary modulator configuration described above in connection with FIG. 1 uses components which require less development than that needed for a conventional modulation format at the same data rate. However, since this configuration needed many more components than other more conventional means, this would add considerably to the complexity of the modulator unit. Much simpler implementation of the subject modulator is possible, however, if at least one of the component modulators used is individually capable of being modulated at the system data rate as explained.

The elements added to the FIG. 2 embodiment over what is shown in the more simplified construction of FIG. 1 includes a 1 Gbps electrical pseudorandom noise (p-n) generator 50 which receives master clock inputs from a phase locked loop 52 which receive its inputs from a pulse input diode 54. These inputs in turn come from the mode-locked laser 12. The output of the diode 54 is also applied to the mode-locked laser 12 and to a control circuit 56 therefor. The outputs of the phase locked loop 52, which are designated as master clock pulses, are applied at several other places in the circuit besides at the p-n generator 50. This includes application to synchronous polarizer driver 58 on lead 42, which driver controls the synchronous polarizers 30 and 38 for the reasons set forth above in connection with FIG. 1. These electrical signals are used for control and timing purposes.

The p-n generator 50 produces outputs to drive various modulators including producing first outputs of one polarization for applying to a modulator driver 60 for driving the input modulator 14, second outputs of polarization designated as ($P_1D$) for applying to Channel A modulator driver 62 for driving the modulator 20, and third outputs of polarization ($P_2D$) which are applied to another modulator driver 64 which controls or drives the third or Channel B modulator 24. The modulator 20 also receives input of polarization $P_1$ from the beam splitter or polarization separator 18, and the modulator 24 receives other inputs of polarization $P_2$ which are split off by the beam splitter 18 and reflected by mirror 22. It can therefore be seen that the inputs to the modulators 20 and 24 are optical inputs, while the control signals from the drivers 62 and 64 and from the p-n generator 50 are electrical signals which are used to control the modulators. The modulators and the synchronous polarizers are therefore active controllable components while other of the components including the beam splitters and time delay devices are passive components. For the most part, all of the elements and components employed in the subject devices are known to the prior art and are available commercially.

FIG. 2A shows the structural details of a typical time delay device or unit such as are used for the units 28 and 36 of the circuit constructions shown in FIGS. 1 and 2. The time delay units are optical devices, each of which includes a polarizing beam splitter element 70 positioned in a crystalline structure at an angle such as that shown in the drawing. Each delay unit also includes two spaced quarter wave plates 72 and 74 located above and below the beam splitter 70, and each unit has spaced opposed mirrors 76 and 78. An optical input beam of given polarization such as a pulsed laser beam 80 is shown entering the delay unit 28 of FIG. 2A from the left and impinging on the beam splitter 70 at a central location. One of the two possible optical polarizations of the input beam passes directly through the beam splitter 70 and exits from the opposite side of the delay unit. This part of the incoming beam is not delayed. The inputs of the other or opposite polarization, however, are deflected or bent and are shown directed at right angles to the straight through beam polarization. This reflected beam or beam portion is identified by the number 82 and is shown redirected upwardly through the upper quarter wave plate 72 and thereafter is reflected by the upper mirror 76 back down through the beam splitter 70 and through the opposite or lower quarter wave plate 74 where it is again reflected this time by the lower mirror 78 and is redirected upwardly to the beam splitter 70 where it is redirected to the right along the same path as the undelayed beam polarization which passed directly through the time delay unit. The quarter wave plates 72 and 74 function to change the polarization of the beam as it passes therethrough so that an output of proper polarization but delayed by a predetermined amount will be produced. This is important since both polarization and delay are important aspects of the transmitted energy. Thus, the time delay units 28 and 36 introduce appropriate delays to the beam energy of one polarization but not of the other, and these delays which are optical time delays are represented in the drawings at some places by the letter D.

The optical modulator means employed in the transmitters of FIGS. 1 and 2 as explained, receive inputs which are in the form of a series of equally spaced pulses produced by a mode-locked laser and they modulate these inputs by effecting two of their parameters, namely, their polarization and their timing. This means that each pulse of the laser output is able to be modulated to produce four detectable conditions, namely, an unchanged condition in which the output pulse has the same polarization and timing as the input, a condition in which an output pulse has the opposite polarization from the input but is of the same timing, a condition in which an output pulse has the same polarization as the input but is delayed, and a condition in which an output pulse has the opposite polarization from the input and is also delayed in time. It should also be recognized that since each output pulse can be in either of two different possible positions, this has the effect of doubling the transmitted pulse rate (or frequency) without, in the case of the two channel constructions of FIGS. 1 and 2, requiring that the elements in either of the channels operate at more than one-half the transmitting frequency. This means that increased frequency or increased pulse rates can be transmitted under less severe operating requirements including with slower acting components and with less heat generation and power requirement.

FIG. 3 is a timing diagram which shows some of the more important time relationships of the various signals and signal components present in a typical circuit such as the circuit of FIG. 2. In the diagram the signals at the various circuit locations are identified by circled numbers which correspond to where the particular signal is present. For example, the circled number 1 is the output of the mode-locked laser 12 and is in the form of a plurality of equally spaced pulses such as might be produced at some desired pulse rate such as at 500 Mbps. These are optical signals.

Item 2 in FIG. 3 identifies an electric data train such as a 1 Gbps data train, and, in a typical situation may be made up of a series of coded data bits arranged in some manner such as in the manner shown.

Item 2A identifies another form of electrical signal referred to as the polarization bit (P) which is available at the output of the p—n generator 50 for applying to and through the modulator driver 60 to the control electrodes of the modulator 14. These signals are used to modulate the modulator 14 by causing it to pass or not to pass certain inputs depending on their polarizations. For example, for some outputs of the driver 60 the modulator 14 will pass only optical signals of one polarization and for other outputs of the driver 60, the modulator 14 will pass optical signals or pulses of the opposite polarization. These signals are electric signals as stated and are referred to as decision bits $B_1$ and $B_2$. The upwardly facing arrows represent optical polarization of one type produced for one form of decision bit and the downwardly facing arrows represent the opposite form of polarization which passes when the other form of decision bits are applied to the modulator. Items 4 and 5 in FIG. 3 show the optical outputs of different polarization separated from each other.

Item 2B in FIG. 3 shows the electric output signals which represent the delay bits. These are applied to the two channel modulators 20 and 24 through their respective drivers 62 and 64. These signals are represented as $P_1D$ and $P_2D$ depending on which form of polarization is to be controlled and delayed. In the embodiment of FIG. 2, the upper channel is shown receiving optical pulses of polarization $P_1$ from the input modulator 14 and the lower channel is shown receiving the reflected outputs from the polarization separator 18 of polarizations $P_2$. For this situation the modulator driver 62 applies electric inputs $P_1D$ to the electrodes of the modulator 20 and the modulator driver 64 applies inputs $P_2D$ to the electrodes of the modulator 24. These signals are shown in FIG. 3 as items 6 and 7. The various combinations of outputs with their appropriate delays for the different channel modulators 20 and 24 are illustrated in items 8, 9, 10 and 11 of FIG. 3. From this it can be seen that each channel is able to handle different forms of polarization and with or without a delay.

Items 12 and 13 of FIG. 3 show the form of the outputs of the synchronous polarizers 30 and 38. The outputs of the polarizer 30 correspond to the outputs of the time delay unit 28 (item 9 of FIG. 3) except for the fact that all of the outputs of polarizer 30 have the same polarization, for example, $P_1$. In like manner, the outputs of the synchronous polarizer 38, item 13, correspond in positions and number to the outputs of the time delay unit 36 except that all of these outputs are of the other polarization, namely $P_2$, in the case illustrated.

The combiner element 32 in FIG. 2 combines the outputs it receives from two synchronous polarizers 30 and 38 and produces the output responses for transmission as shown in item 14. The transmissions have components of both polarizations $P_1$ and $P_2$ and it also has some of its transmitted bits or pulses delayed and others not. This means that each transmitted pulse is capable of having any one-of-four possible states of information imposed on it depending on its polarization and whether it is delayed. FIG. 3 shows these various possibilities and how they are produced in a single transmitted pulse wave using electrical and optical principles. Furthermore, since the subject transmissions are preferably pulses from a coherent source such as from a mode-locked laser there is little or no dispersion or spreading out of the transmitted signals and hence the confidentiality of the messages is relatively easy to maintain. In the diagram of FIG. 3, $P_1$ and $P_2$ represent the different possible polarizations, the output of the mode-locked laser has polarization $P_2$, a high level logical 1 at the modulator inputs changes the polarization but not so of low level inputs (logical zeros), $t_1$ represents zero (0) delay, and $t_2$ represents some predetermined time delay usually in the nanosecond range.

FIG. 4 shows a very simplified embodiment of the subject pulse quaternary modulator (PQM) transmitter which accomplishes the same basic objectives as the above described constructions in that it produces one-of-four codes for imposing on each output pulse of a laser source. The simplified configuration uses a first information bit to determine pulse position and a second information bit to determine the pulse polarization as will be explained. The transmitter of FIG. 4 includes a first or input modulator 90 which is shown for illustrative purposes as being a 500 megahertz modulator positioned to receive the output of the mode-locked laser pulse train. The transmitter also includes an output modulator 92 shown as a one gigahertz response modulator. Positioned optically between the modulators 90 and 92 is a time delay device 94 which may be similar in construction to the time delay device illustrated above in connection with FIG. 2A. The transmitter illustrated in FIG. 4 is therefore a single channel transmitter rather than being a dual channel transmitter as in the above constructions, and in this construction the first information bit which is an electric signal applied to the modulator 90 determines the pulse position (whether normal or delayed) and the second information bit which is also an electric signal is applied to the modulator 92 and determines the polarization. Also, in the construction of FIG. 4 the second or output modulator 92 must be capable of responding to rise and fall times of less than about a nanosecond, if the delay element 94 is constructed to introduce delays of one nanosecond for the polarization of the inputs it receives from the input modulator 90, namely, for polarization $P_2$.

In the simplified circuit of FIG. 4 the first modulator 90 therefore makes the decision as to whether there will be a delay or no delay produced. This is done by application using the truth table in FIG. 4A by a logic or control element 96 which examines each incoming of two bits in the electrical data stream. The output modulator 92 then decides which polarization will be selected for passing to the output. This is accomplished at the same time, by the same means, as that which decided whether there was a delay or no delay. As indicated above modulators 90 and 92 are active (controllable) elements while time delay devices such as the device 94 are passive.

FIG. 4A in addition to having a truth table includes a chart which illustrates the various possibilities available from the transmitter of FIG. 4. The four possible outputs that can be produced, namely, the 0, 1, 2 and 3 conditions are shown with their accompanying parameters illustrated The 0 line illustrates the condition where the output will have polarization $P_2$ and no time delay. In this case, the input has polarization $P_1$ and the output modulator 92 selects the opposite polarization for transmitting, namely, polarization $P_2$. For the second or "1" condition the same input circumstances prevail, namely, an input is of polarization $P_1$, but in this case, the output modulator 92 selects the same polarization $P_1$ over polarization $P_2$ for transmitting so that the output has the same polarization as the input but again without any time delay. For the other two conditions illustrated the input modulator 90 is constructed to change the input polarization from polarization $P_1$ to polarization $P_2$ and this enables the time delay device 94 to introduce a 1 nanosecond time delay. In the "2" condition therefore, the output modulator 92 selects the $P_2$ polarization over the polarization $P_1$ so that the output is of $P_2$ polarization, and is delayed by one nanosecond. Likewise, in the "3" condition the input modulator 90 is conditioned to change the polarization from $P_1$ to $P_2$ so that the time delay device 94 can again operate to produce a time delay of one nanosecond. In this case, however, the output modulator 92 is controlled to select the polarization $P_1$ over the polarization $P_2$ so that the output is of polarization $P_1$ but delayed by one nanosecond. The truth table already referred to illustrates these various modulation possibilities that are available from the single channel transmitter construction of FIG. 4.

FIG. 5 shows a two channel pulse quaternary means operating on the same principles but employed in a receiver 100 rather than in a transmitter. The receiver 100 receives modulated signals from a transmitter such as those disclosed in FIG. 1, 2 and 4 and operates to demodulate them in order to extract the information that is transmitted. In the case of the receiver, the inputs received are applied first to a polarizing beam splitter 102 which operates to separate them according to their polarization. This means in the embodiment as disclosed that all pulses of polarization $P_1$ pass directly through the beam splitter 102 and all pulses of polarization $P_2$ are bent or reflected. The receiver also makes use of the fact that alternate pulses may be of opposite polarization which means that a two detector system will be used for the receiver. This has the advantage that the frequency response can be substantially reduced from what would be required for a single detector system, and this also means that the possibility of "spillover" of one pulse into the next slot is eliminated. It is interesting to note that the implementation of the receiver is the same whether the transmitter operated on two positions each for two polarizations or on four discrete positions in which it happens alternate delays are of opposite polarizations. As already explained, these are important advantages and ones which substantially increase the frequency range and minimize the possibility of cross-talk or "spillover".

Referring again to FIG. 5, receiver 100 includes means that receive and separate input optical pulse information into one-of-four possible positions based on polarization and on whether or not there has been a time delay. These are the same possible four combinations discussed above in connection with FIG. 4A. The polarization separation is made by the polarizing beam splitter 102 as aforesaid with the pulses of one polarization, namely, polarization $P_1$, being fed to a first high speed photomultiplier tube 104 and pulses of the other or opposite polarization $P_2$ being fed to a second high speed photomultiplier tube 106. The beam splitter 102 can be of the same or similar type used in the transmitters. The outputs of the photomultiplier tubes 104 and 106 are then fed as respective electric inputs to a bit synchronizer and detection logic circuit 108 which produces the desired outputs for some useful purpose such as to be used in a computer, a recorder, to create an image or sound, or for any number of other purposes. The output is shown for illustrative purposes as being a 1 Gbps pulse train. Thus it is seen that the receiver of FIG. 5 detects the polarization and position of each received input laser pulse and reconstructs or demodulates it to reproduce the transmitted information.

FIG. 6 shows other of the details of a typical receiver such as that shown in FIG. 5. In the construction of FIG. 6, the high speed photomultipliers (PTM) are shown as being dynamic crossed field photomultipliers (DCFP) although any type of photomultiplier, photodiode or photodetector can be used for this purpose including any such device which converts optical energy to electric energy. The components of FIG. 6 that are similar to components in FIG. 5 are similarly numbered in the drawing. The outputs of the photomultipliers 104 and 106 in FIG. 6 are fed to a one-of-four detector circuit 110 and also to respective delay devices 112 and 114 which are shown for illustrative purposes as being 1 nanosecond delay devices. The delay devices 112 and 114 may be similar to the delay devices described above, on of which is shown in detail in FIG. 2A. The detector circuit 110 receives frame synchronizing inputs on lead 116 and produces outputs which are identified in the drawing as polarization (P) bit outputs on lead 118 and delay (D) bit outputs on lead 120. Thus, the receiver shown in FIG. 6 receives optical input pulses which it separates according to polarization, and applies the respective polarization bits to respective photomultiplier devices to produce one-of-four identification for each input pulse. The detector means 110 may have several different forms to receive the four possible signals for each bit but the construction of the detector means is not at the heart of the invention.

The optimum decision algorithm includes means to choose the channel with the greatest received energy. This can be easily accomplished using six wideband differential amplifiers to determine the sign of the difference between the six possible combinations of the four output signals produced by the receiver. Given the sign or polarization of the six differences, the channels with the largest output can then be determined using only four logical elements such as logical gate elements. This can be done by a circuit such as that shown in FIG. 7. It should be recognized, however, that only differences are used or sensed in the circuit of FIG. 7, and therefore no threshold control adjustment is necessary as would be the case of a device such as a pulse gate binary modulation (PGBM) system as well as some other constructions. However, in the present construction care must be taken to maintain equal gain in the two detector channels. Incorrect clock-phasing is also relatively easily detected with this implementation. When the clock is out-of-phase in the construction of FIG. 7, the electric responses generated such as the responses $e_1$, $e_2$, $e_3$, and $e_4$ will quite often be present simultaneously in the device. This condition cannot exist when the clock-phasing is correct, and this can be easily verified using relatively few logic elements to correct the clock phase.

Referring to FIG. 7, the elements to the left are similar to those shown in FIG. 6 and the elements to the right, which are logic elements, include six registers 122–132, each of which has an input connected to a phase-locked laser source 134 which serves as a source of clock pulses. In the particular embodiment shown, these clock pulses may be of some desired frequency such as being 500 megahertz clock pulses. Each register also has another input connected to a respective driver or input element 136–146, and these devices receive their inputs from the outputs of the respective photomultipliers shown as dynamic crossed field photomultipliers 104 and 106. Some of the inputs to the elements 136–146 are received directly from the photomultipliers and others are delayed by passing through associated delay units 147 and 149 of the types described above. The inputs to the devices 136–146 are indicated as the voltages $e_1$, $e_2$, $e_3$, and $e_4$ at the locations shown. The registers 122–132 have output terminals at which the various combinations of the possible inputs appear as indicated, and these output terminals are connected to corresponding inputs of the four logic AND gate circuits 148–154 which produce the desired outputs. For example, the AND gate 148 produces an output when all of its input terminals have a signal that includes as a component thereof the signal $e_1$, the AND gate 150 produces an output when all of its inputs have as a component thereof the signal $e_2$ and so forth for the gates 152 and 154.

The simpler embodiments of the subject pulse quaternary modulator as shown in the transmitter of FIG. 4 and in the receiver of FIG. 5 are the embodiments which seem to offer the greatest long range capability.

FIG. 8 shows another embodiment of a single channel pulse quaternary modulation system employed as a transmitter and which operates on four discrete time positions. This is made possible in this construction by the addition of a second time delay unit as will be explained. The first three components of the transmitter system of FIG. 8 are similar and operate similarly to the first three components in the transmitter of FIG. 4 except for the fact that in the FIG. 4 construction the time delay that is used is with respect to one form of polarization, namely, polarization $P_2$, while the delay means 160 in the FIG. 8 construction has its delay with respect to the other form of polarization, namely, $P_1$. The addition of the second time delay means 162 in the construction of FIG. 8 makes it possible to place a pulse in any one of four separate time positions. For a 1 Gbps system the first delay produced by the delay unit 160 in the construction as shown is a 1 nanosecond delay, and the second delay produced by the delay unit 162 is a ½ nanosecond delay so that a particular pulse can be positioned at any one of four possible ½ nanosecond intervals. This will depend upon the control voltages applied to the active elements or modulators 164 and 166 which control and determine the form of the polarization present in the pulses that exit from them. Although the outputs of both modulators 164 and 166 may be of either polarization $P_1$ or $P_2$, a one detector receiver with sufficiently wideband response characteristics can be employed to receive the transmissions therefrom since the information imparted to the transmitted pulses by the transmitter means is determined entirely from the positions of the pulses and not from their polarizations. A simplified form of receiver capable of receiving such transmissions is shown in FIG. 9 and is described hereinafter.

FIG. 8A shows the type of responses including the various possible pulse positions and polarization of the outputs produced by the transmitter shown in FIG. 8. Note that the outputs of the first time delay unit 160 are similar to those produced by the time delay unit 94 in FIG. 4, but that the outputs of the second time delay unit 162 are different and spaced differently than in the FIG. 4 construction, namely, at ½ nanosecond intervals instead of at nanosecond intervals.

The simplified receiver shown in FIG. 9 essentially has the same electronics as the two detector or two channel case described above in connection with FIGS. 5–7. However, the construction of FIG. 9 has two distinct advantages over the previous two detector, two channel receivers, one being that the gain balance that needs to be maintained between detectors is no longer a consideration, and secondly, it is no longer necessary with the construction of FIG. 9 to produce polarization separation as indicated above. This being so, and assuming that the necessary components are available, the construction shown in FIG. 9 is the simplest and most advantageous implementation of pulse quaternary modulation means as applied to a receiver. The embodiment of FIG. 9 requires a modulator driver having good response characteristics and a relatively high speed photomultiplier device such as a dynamic crossed field photomultiplier. As shown in the drawing, the receiver of FIG. 9 has a single detector component 170 and another component which is described as being a bit synchronous and decision logic means 172. Both of the components 170 and 172 may be similar to corresponding components of the other system embodiments already described. As explained, each input pulse to the receiver of FIG. 9 as already explained, has four possible positions shown spaced at ½ nanosecond intervals and polarization as far as the receiver is concerned is not important.

This means that the output pulses from a transmitter such as that of FIG. 8 can be received by the receiver of FIG. 9 regardless of their polarization so long as the receiver has sufficiently wideband response characteristic. The single detector receiver of FIG. 9 is not only structurally simpler and less complex but it has the further advantages already mentioned in that it eliminates gain balance problems and the need for polarization separation means. Therefore, the construction shown in FIG. 9 is the simplest and most advantageous implementation of receiver employing pulse quaternary modulator (PQM) means.

It should be pointed out also that the spacing of the delay in the two cases does not have to be in a two to one relationship. That is the spacing of the second delay does not need to be one-half of the spacing of the first but can be any convenient fraction of the first. The minimum wideband response, however, comes at one-half the first delay. There is up to about 6 dB power gain by using a pulse quaternary modulator system (PQM) as compared to use of a pulse gated binary modulator (PGBM). However, since extra optical components are required for the PQM, the corresponding optical loss may be subtracted from the power gain. The optical losses are expected to approximate about seven percent (7%) of the output and this includes a five percent (5%) optical loss due to the inclusion of one or more synchronous polarizers and a loss of about two percent (2%) due to the finite extinction ratio of the synchronous polarizers. In other words, the total loss to be subtracted from the power gain is approximately nine percent (9%) when comparing a PQM with a PGBM. This means that in the simpler configurations of FIGS. 4 and 8, where fewer optical components are required and no synchronous polarizers, there is an even more substantial difference in the operating efficiency.

The term pulse quaternary modulation (PQM) as used herein refers to a modulation technique, which when applied to a laser input pulse or pulse train such as from a mode-locked laser, proposes one of four possible operations on the pulse as set forth above. Furthermore, all of these operations are accomplished at optical frequencies, and a laser pulse which enters the subject modulator means with some preestablished polarization $P_1$ may have any one (but only one) of the four operations performed on it as illustrated in FIG. 4A, as follows:

a. It can have its polarization changed to $P_2$ with no time delay, the "0" condition;

b. It can retain its original polarization $P_1$ and be otherwise uneffected in which case the output is the same as the input, the "1" condition;

c. It can have its polarization changed to polarization $P_2$ and it can be delayed by some predetermined delay time T, the "2" condition; and, d. It can retain its input polarization and it can be delayed by the predetermined time T, the "3" condition.

Any one of these possibilities can be accomplished in a transmitter having two active modulator components and a passive optical time delay device which is sensitive to one but not to the other polarization condition as shown in FIG. 4. The truth table included in FIG. 4A diagramatically shows these various possibilities. The conditions discussed are optical not voltage conditions. The symbol "+" in the truth table in association with the modulators $M_1$ and $M_2$ represents the condition necessary to produce a change of polarization, and a "−" symbol represents the condition of the modulators $M_1$ and $M_2$ in which no change in polarization occurs. "+" and "−" refer to voltage conditions applied to the electrodes of the active elements in the modulators. Also as explained above, the time delay units which are passive units, pass one form of polarization directly while producing a time delay in the other form of polarization.

For the receiver, the choice is identified by use of a passive polarization separator which directs all input signals pulses of polarization $P_1$ to one detector and all input signal pulses of polarization $P_2$ to another detector. The position in time of each received pulse at the detector identifies whether it has been delayed or not.

Thus it is seen that two information bits are sensed by each pulse. Hence, where M is the number of unique choices, the $\log_2 M$ = the bits per pulse. If the number of unique choices per bit or pulse is 4 as in the case of the receiver of FIG. 9, for example, then the advantages of the subject pulse quaternary modulation (PQM) technique lies in the facts that (1) for a given laser pulse rate the information transmission and reception rate can be twice that of the pulse rate, and (2) the amount of average laser power required for a given application is less than for systems that employ other more conventional modulation techniques, other things being equal. Both of these advantages are significant especially as applied to relatively high data rate communication systems.

Pulse quaternary modulation has application to many different kinds of systems and system components including transmitting and receiving systems such as are used on spaced vehicles and satellites, and elsewhere, as well as in many other data communication systems and links. Furthermore, PQM can be constructed to operate in high data rate systems, but with component devices operating at frequencies or data rates that are less than the system rate in some cases. Also, as explained, the subject modulation means provide relatively high communication efficiency at relatively low power requirements.

Thus there has been shown and described a novel pulse quaternary modulation technique and novel implementations thereof which fulfill all of the objects and advantages sought therefor. Many changes, modifications, variations, and other uses and applications for the subject means, however, will become apparent to those skilled in the art after considering this specification and the accompanying drawings. All such changes, modifications, variations, and other uses and applications which do not depart from the essence and scope of the invention are deemed to be covered by the invention which is limited only by the claims which follow.

What is claimed is:

1. Means to modulate pulse optical signals from a pulse source comprising, first, second and third modulator means each having an optical input and an optical output, means associated with the first modulator means to predeterminately polarize the optical pulses received thereat from said source, polarizing beam splitter means positioned to respond to the optical outputs of the first modulator means to separate the output pulses therefrom according to their polarization, said second modulator means being positioned to receive optical output pulses from said beam splitter of one polarization, said third modulator means being positioned to receive optical output pulses from said beam splitter of a different polarization, means associated respectively with said second and third modulator means to delay outputs exiting therefrom of a selected polarization only, other means including synchronous polarizer means and drive means therefor respectively positioned to receive the optical output pulses of said second and third modulator means, and means to optically combine the outputs of said respective synchronous polarizer means to produce a pulse train of optically modulated pulses for transmission.

2. The means of claim 1 including control means associated respectively with said second and said third modulator means, each of said control means including a source of electric control pulses and means to apply said pulses to the associated modulator means to control the polarization of the optical pulses exiting therefrom.

3. The means of claim 1 wherein said optical combining means include passive beam splitter means.

4. A pulse quaternary modulation transmitter for modulating optical light pulses comprising modulator means including a crystal member having an optical input, an optical output, and control means including a first source of electric control signals and means for applying said control signals to the crystal member, said crystal member being positioned to receive the optical light pulses and to control the polarization of the optical pulses exiting therefrom in response to the characteristics of the electric control signals, optical delay means positioned to receive the optical pulses from said modulator means including means to delay pulses therefrom of a selected polarization only, and second modulator means positioned to receive the optical pulses from the modulator means after passing through the pulse optical delay means, said second modulator means having an optical input where signals are received from the optical delay means, an optical output and control means including a second source of electric control signals and means for applying the control signals to the second modulator means to control the polarization of the optical pulses exiting therefrom.

5. The transmitter of claim 4 including second delay means positioned to receive the optical pulses exiting from said second modulator means, said second optical delay means time delaying pulses of one polarization only, said time delays being equal to a fraction less than unity of the time delays produced by the aforesaid optical delay means.

6. The transmitter of claim 4 wherein the optical light pulses are produced by a mode-locked laser.

7. The transmitter of claim 4 wherein the frequency of the electric control signals from the first source is the same as the frequency of the electric control signals from the second source.

8. Modulator means for imposing intelligence on a train of spaced optical pulses comprising an electrooptical circuit including active and passive circuit elements, a first active element including an optical member positioned to receive a train of spaced optical pulses, means associated with said optical member including a source of electric signals and means for applying the signals therefrom to the first active element, selected ones of said signals allowing passage through the first active element of input optical pulses of one polarization and others of said signals allowing optical pulses of a different polarization to exit therefrom, a passive circuit member positioned in the path of the optical pulses exiting from said first active element, said passive circuit member including means to separate exiting optical pulses of different polarizations, second and third active members positioned to respectively receive the exiting pulses of each different polarization, means respectively associated with said second and third active members including sources of electric signals and means for applying the electric signals to the respective active members to control the polarization of the respective optical pulses exiting therefrom, passive circuit pulse delay means positioned in the respective paths of the optical pulses exiting from the second and third active members, the delay means associated with said second and third active circuit members predeterminately delaying pulses of particular polarizations only exiting therefrom, synchronous polarizer means positioned to respectively receive the outputs of said delay means to bring the outputs therefrom into a useful relationship, and means to combine the optical pulses exiting from the respective synchronous polarizer means to produce an output pulse train wherein the individual pulse are polarized and positioned therein to represent the intelligence to be imposed as optical modulation on the train of pulses.

9. The modulator means of claim 8 wherein the pulse train to be modulated is produced by a mode-locked laser.

10. Means to modulate optical pulses such as a train of spaced optical pulses produced by a mode-locked laser comprising a crystal modulator having an input positioned to receive the output pulse train of the laser, means to control said modulator including a first source of control signals and means for applying said signals to the modulator, certain of said signals exciting the crystal modulator to cause pulses exiting therefrom to be of one polarization and other of said signals causing exiting pulses from the modulator to be of a different polarization, means positioned to receive the optical output pulses of said modulator including means to delay by a predetermined time interval exiting optical pulses of a selected one of the polarizations only, a second crystal modulator having an input positioned to receive the outputs of said delay means, control means associated with said second modulator including a second source of control signals and means for applying the control signals from said second source to said second modulator to control and determine the polarization of the optical pulses exiting therefrom.

11. The means defined in claim 10 wherein the control signals from said first and second sources of control signals have the same frequency.

12. Means to modulate optical pulses such as a train of optical pulses from a mode-locked laser comprising a crystal modulator device positioned to receive a train of optical pulses from the mode-locked laser, control means associated with said crystal modulator device including a source of electric control signals and means for applying said signals to the crystal modulator, certain characteristics of said signals determining the polarization of the pulses exiting from said crystal modulator, means positioned in the path of the output optical pulses of said crystal modulator device including means to predeterminately delay exiting optical pulses of a selected polarization only, a second crystal modulator device positioned in the path of the optical pulses exiting from said delay means, control means associated with said second crystal modulator device including a second source of electric control signals for applying thereto to control the second crystal modulator device and to determine the polarization of the optical pulses exiting therefrom, and second delay means positioned in the path of the exiting optical pulses from said second crystal modulator device, said second delay means including optical means to delay exiting pulses therefrom of a selected polarization only, each optical pulse exiting from the second delay means having one of two possible polarizations and one of two possible times of occurrence in the exiting pulse train.

13. Means to modulate optical pulses such as a train of optical pulses from a mode-locked laser comprising first modulator means positioned to receive a train of optical pulses from the mode-locked laser, control means associated with said first modulator means including a source of electrical signals and means for applying said signals to the first modulator means, the signals exciting said modulator means the polarization of the optical pulses exiting therefrom, means positioned in the path of the output optical pulses of said first modulator means including passive optical means to predeterminately delay exiting optical pulses of a selected polarization only, second modulator means positioned in the path of the optical pulses exiting from said delay means, said control means associated with said first modulator means including an output including a second source of electric control signals for applying to the second modulator means, certain characteristics of said control signals exciting said second modulator means determining the polarization of the optical pulses exiting from the second modulator means, each optical pulse exiting from said second modulator means having one of two possible polarizations and one of two possible times of occurrence in the exiting pulse train.

14. The means to modulate defined in claim 13 wherein the source of electric control signals associated with the second modulator means has the same frequency as the source of electric control signals associated with the first modulator means.

15. The means to modulate defined in claim 13 wherein said passive means to predeterminately delay exiting optical pulses of a selected polarization only include means to separate optical pulses of different polarization from each other and means to cause pulses of one of said separated polarizations to travel a greater distance through the delay means than pulses of a different polarization.

16. The means to modulate defined in claim 15 wherein said means to cause pulses of one polarization to travel a greater distance include optical beam splitter means, reflector means and quarter wave plate means.

17. The means to modulate defined in claim 13 including a second passive delay means positioned in the path of the optical pulses exiting from the second modulator means, said second delay means including means to delay exiting pulses of a selected polarization only by an amount of time equal to half of the predeterminate time delay produced on the selected pulses exiting from the first modulator means whereby each optical pulse exiting from the second delay means can occur at any one of four possible times.

18. Means to modulate optical pulses comprising a source of pulsed optical coherent light, first, second and third modulator means each having optical input and output means, said first modulator means being positioned to receive at its input pulses of optical light from said source, control means associated with the first modulator means including a source of control signals and means for applying said signals to said first modulator means to predeterminately polarize light pulses exiting therefrom, means to separate pulses on the basis of differences in polarization positioned to respond to the outputs of the first modulator means, said second modulator means being positioned to receive outputs of one polarization from the pulse separator means and said third modulator means being positioned to receive outputs from the pulse separator means of a different polarization, respective means in the outputs of said second and third modulator means to delay in time outputs therefrom of selected polarizations, and means to optically combine the outputs of said respective delay means for transmission.

19. A pulse quaternary modulation transmitter comprising a source of laser pulses, modulator means including a crystal member having an optical input, an optical output, and means including electric signal producing means operatively associated with the crystal member to control the polarization of the pulses exiting therefrom, said input being positioned to receive the laser output pulses from said source, time delay means positioned to receive the outputs of said modulator means including means to delay the time of occurrences of selected output pulses of the modulator means based on polarization, and second modulator means positioned to receive the output pulses of the time delay means, said second modulator means including a second crystal member having an optical input, an optical output and means including electric signal producing means operatively associated with the second crystal member to control the polarization of the pulses exiting therefrom, the combination of the electric signals applied to the first and second modulator means determining the polarization and time of occurrence of each pulse exiting from the second modulator means.

20. The transmitter of claim 19 including a second time delay means positioned to receive the outputs of said second modulator means, said second time delay means producing delays in the time of occurrence of optical pulses of a predetermined polarization, said time delays being equal to a fraction of the time delays produced by the aforesaid time delay means.

21. A pulse quaternary modulation receiver for receiving and detecting modulated trains of optical signals in the form of laser energy pulses comprising optical input means positioned to receive optically modulated laser energy pulses, said input means including optical means for separating the received laser energy pulses according to differences in polarization, first photomultiplier means positioned to receive energy pulses from said separating means of one polarization and to produce electric responses that represent said pulses, second photomultiplier means positioned to receive energy pulses from said separating means of a different polarization and to produce electric responses that represent said pulses, and means to combine and detect the outputs of said first and second photomultiplier means including means to bit synchronize the said outputs.

22. The receiver of claim 21 wherein the first and second photomultipliers are dynamic crossed field photomultipliers.

23. The receiver of claim 21 wherein the said first and second photomultipliers each includes means associated therewith to delay selected outputs therefrom.

24. The receiver of claim 21 wherein said means to detect includes a one-of-four detector having an output at which delayed energy pulses occur.

25. The receiver of claim 23 wherein the means to detect the outputs of the photomultipliers include register means having a plurality of inputs operatively connected to receive selected outputs of the photomultiplier means including the outputs of the delay means, said register means also having a plurality of outputs, and gate circuit means connected to receive selected outputs of the said register means.

26. A pulse quaternary modulation receiver for receiving and detecting optical energy pulses each of which can be located in one-of-four possible time positions to represent different information bits comprising a photomultiplier having an input positioned to receive a train of optically modulated energy pulses, said photomultiplier having frequency response characteristics which enable it to respond to and to detect optical energy pulses in a pulse train occuring at any one of four possible times therein, sychronous polarizer means including driver means therefor connected to respond to the outputs produced by the photomultiplier to establish a basis for identifying at which of the four possible times each received energy pulse is positioned, and output means including means to make a decision based on which of the four possible times each pulse occurs.

27. Means for receiving and demodulating modulated optical pulses in the form of polarized pulsed laser energy comprising input means for receiving polarized modulated pulsed laser energy including optical means for separating received laser energy of one polarization from received laser energy of a different polarization, first photomultiplier means positioned to respond to pulse laser energy of said one polarization and to produce output signals corresponding thereto, second photomultiplier means positioned to respond to pulse laser energy of said different polarization and to produce output signals corresponding thereto, and means to combine the output signals produced by said first and said second photomultiplier means including means for detecting and bit synchronizing the said output signals.

28. The receiver of claim 27 wherein the first and second photomultiplier means are dynamic crossed filed photomultipliers.

29. The receiver of claim 27 wherein respective electrical time delay means are associated with the outputs of said first and second photomultiplier means, said delay means producing delays in the times of occurrence of selected ones of the output energy pulses from the photomultiplier means, and detector means having inputs connected to receive the outputs of each of said first and second photomultiplier means and the outputs of each of said respective time delay means.

30. The receiver of claim 29 wherein said detector means include a one-of-four detector having a first output and a second output, delayed output bits occurring at one of said outputs.

31. Means for receiving and detecting a train of modulated laser pulses wherein each pulse in the received train can occur at one-of-four possible times comprising a source of pulse modulated laser energy wherein each pulse can occur at one-of-four possible equally spaced times, means capable of responding to the train of pulses including means to detect at which of the four possible times each of the received pulses occurs, and means responsive to the time of occurrence of each pulse to make a decision based thereon.

32. Means for demodulating trains of optical pulses wherein each of the individual pulses in the train can have one of two different polarizations, and wherein each pulse in the train can occur at one of two possible times comprising a passive optical element positioned in the path of the train of pulses to be demodulated, said passive optical element including means to separate pulses in the train of one polarization from pulses of a different polarization, means positioned to respond to the pulses of said one polarization including active electrooptical means to convert said optical pulses to electrical pulses, means to separate the electric pulses exiting from said converting means according to whether they occur at one or the other of the two possible times, other means positioned to respond to the pulses of said different polarization including other means to convert said optical pulses to electric pulses, means responsive to said electric responses from said other converting means for separating said electric pulses according to whether they occur at one or the other of the two possible times, and detector means including means having a plurality of inputs and means connecting the respective electric outputs of the first and second converting means to said inputs, said detector means including means for producing output electric responses that represent the polarization and occurrence time of each optical pulse in the input train.

33. The demodulating means of claim 32 including means associated with the detector means to synchronize the responses received thereat.

* * * * *

UNITED STATES PATENT OFFICE
CERTIFICATE OF CORRECTION

PATENT NO. : 3,956,626

DATED : 11 May 1976

INVENTOR(S) : Monte Ross

It is certified that error appears in the above-identified patent and that said Letters Patent are hereby corrected as shown below:

Column 4, line 47, "Serveral" should read --Several--. Column 10, line 21, insert --.-- after "illustrated." Column 18, line 10, after "means" insert --controlling--.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*